United States Patent Office 3,301,756
Patented Jan. 31, 1967

3,301,756
19-NOR STEROIDS OXYGENATED IN THE 11-POSITION, PROCESS OF PREPARATION AND UTILIZATION
Robert Joly, Montmorency, Julien Warnant, Neuilly-sur-Seine, and Jean Jolly, Clichy-sous-Bois, France, assignors to Roussel-UCLAF, Paris, France, a corporation of France
No Drawing. Filed June 5, 1964, Ser. No. 373,116
Claims priority, application France, July 10, 1963, 941,004; Oct. 22, 1963, 951,379; Apr. 15, 1964, 971,005
10 Claims. (Cl. 167—65)

The present invention relates to new dienic 11-oxygenated steroids, the novel process of preparing these compounds and their utilization. It more particularly relates to 11β-hydroperoxy-19-nor-steroids of the general Formula II:

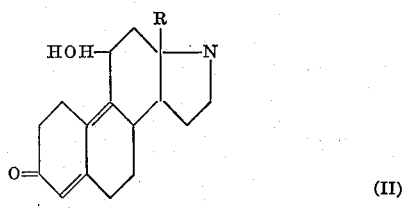

(II)

in which R represents a lower alkyl and particularly methyl, ethyl, propyl or isopropyl and A represents

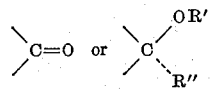

R' being hydrogen or an acyl radical of an organic carboxylic acid having from 1 to 18 carbon atoms and particularly the acetyl or the benzoyl radical, R" being hydrogen or a lower hydrocarbon radical substituted or not, saturated or not, and particularly ethynyl, chloroethynyl, vinyl, methyl or ethyl.

It is well known that the introduction of an oxygen in the 11-position by chemcial methods, generally causes considerable difficulties. This is a problem which plays part both in ordinary preparations as well as in total synthesis of the steroids. In certain cases this question has been solved by microbiological oxidation, which requires special equipment. With reference to the known chemical methods of introducing an oxygenated function in the 11-position, they are not numerous and do not always give satisfaction from the standpoint of yields. For instance, the action of the per acids on 9,11-dehydro steroids results only in a 9,11-epoxide. Similarly, the action of hypobromous acid on a 9,1-dehydro steroid introduces into the steroid molecule a frequently undesirable halogen which must subsequently be eliminated.

An object of the presetn invention is the production of 11β-hydroperoxy-19-nor steroids selected from the group consisting of compounds of the formula

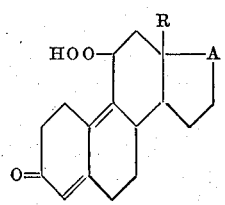

wherein R is a lower alkyl and A is a divalent linkage selected from the group consisting of

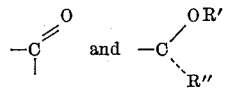

R' is a member selected from the group consisting of hydrogen and the acyl radical of an organic carboxylic acid having from 1 to 18 carbon atoms and R" is a member selected from the group consisting of hydrogen, lower alkyl, lower alkenyl, lower alkynyl and chlorinated lower alkynyl.

A further object of the invention is the development of a process for the production of 11β-hydroperoxy-19-nor steroids selected from the group consisting of compounds of the formula

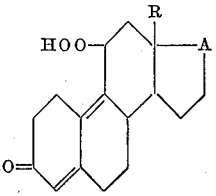

wherein R is a lower alkyl and A is a divalent linkage selected from the group consisting of

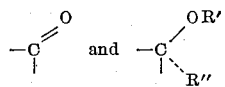

R' is a member selected from the group consisting of hydrogen and the acyl radical of an organic carboxylic acid having from 1 to 18 carbon atoms and R" is a member selected from the group consisting of hydrogen, lower alkyl, lower alkenyl, lower alkynyl and chlorinated lower alkynyl which comprises the steps of oxidizing a compound of the formula

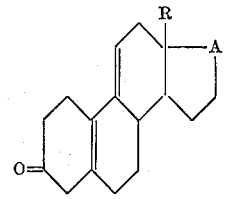

wherein R and A have the above-noted meanings by the action of oxygen-containing gas in the presence of a weakly alkaline media in an inert organic solvent and recovering said 11β-hydroperoxy steroids.

A further object of the invention is the development of a process for treatment of hypercholesterolemia which comprises administering a safe but effective dose of an 11β-hydroxy-19-nor steroid selected from the group consisting of compounds of the formula

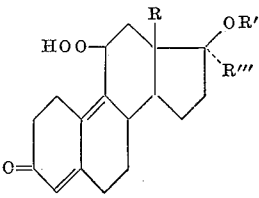

wherein R is a lower alkyl, R' is a member selected from the group consisting of hydrogen and the acyl radical of an organic carboxylic acid having from 1 to 18 carbon atoms and R''' is a member selected from the group consisting of hydrogen and lower alkynyl.

These and other objects of the invention will become more apparent as the description thereof proceeds.

It has been unexpectedly found, and this represents part of our invention that, contrary to other steroids, particularly 9,11-dehydro steroids which do not contain a 5,10 double bond, the oxidation of 3-oxo-$\Delta^{5(10),9(11)}$-19-nor steroids in weakly alkaline medium by the action of an oxygen-containing gas leads to 11β-hydroperoxides without producing an attack on the doubly-activated methylene in the 4 position. The oxidation in the 11 position in the present invention presents no analogy with the oxidation in the 4 position of 3-oxo steroids, where a potassium enolate is oxidized by oxygen.

The compounds of general Formula II, object of the invention, present interesting physiological properties.

Thus, for example, the compounds of general Formula IV:

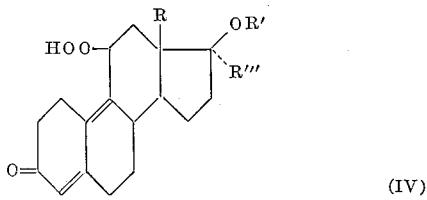

(IV)

in which R and R' have the preceding significance and R''' being hydrogen or the ethynyl radical, possess an important hypocholesterolemic activity.

Among compounds of general Formula II, objects of the invention, can be cited the following preferred compounds:

11β-hydroperoxy-$\Delta^{4,9}$-estradiene-17β-ol-3-one

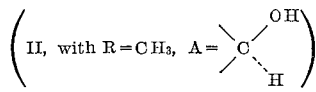

11β-hydroperoxy-17α-ethynyl-$\Delta^{4,9}$-estradiene-17β-ol-3-one

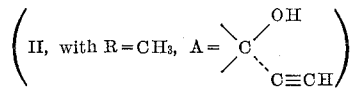

11β-hydroperoxy-17β-benzoyloxy-$\Delta^{4,9}$-estradiene-3-one

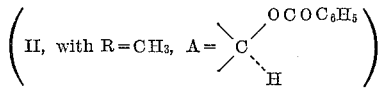

11β-hydroperoxy-17α-methyl-$\Delta^{4,9}$-estradiene-17β-ol-3-one

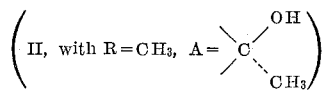

11β-hydroperoxy-17α-ethyl-$\Delta^{4,9}$-estradiene-17β-ol-3-one

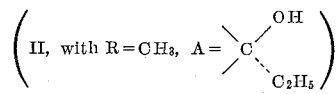

11β-hydroperoxy-$\Delta^{4,9}$-estradiene-3,17-dione

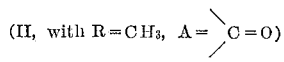

The invention also has for its object a process of preparation of compounds of general Formula II. This process is essentially chaarcterized in that a 3-oxo-$\Delta^{5(10),9(11)}$-gonadiene of Formula I

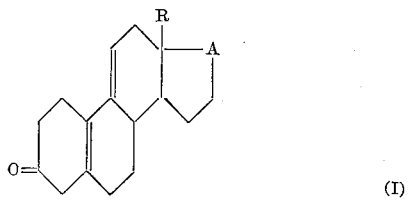

(I)

wherein R and A have the above-noted meanings is oxidized with the aid of an oxygen-containing gas such as oxygen or air while operating in a weakly alkaline media in an inert organic solvent. The desired 17-substituted-11β-hydroperoxy-$\Delta^{4,9}$-gonadiene-3-ones of Formula II:

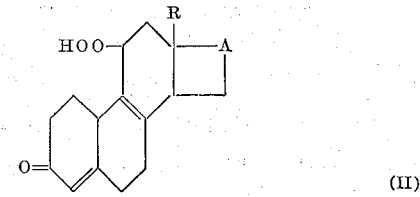

(II)

in which R and A have the above-noted meanings are recovered.

The weak alkalinity of the oxidation media can be ensured by the presence in said media of a tertiary aliphatic amine, as a tri-lower-alkyl-amine such as triethylamine, or a tertiary cyclic amine, as for example, pyridine or even an organic acid derivative of quaternary ammonium compound, such as tetramethyl ammonium acetate or benzyl trimethyl ammonium acetate.

It is advantageous to effect the oxidation in an inert organic solvent such as a lower alkanol, for example, methanol or ethanol, or in an N,N-di-lower-alkyl-lower-alkanoyl-amide, such as dimethylformamide, or also in a mixture of these two.

No critical temperature limitations are necessary; the oxidation is advantageously conducted at ambient temperatures.

As it can be noted, the starting compounds of Formula I, when

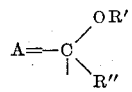

can be esterified in the 17β-position. Utilization of such esters results in obtention of compounds of formula II esterified in the 17β-position with an organic carboxylic acid having from 1 to 18 carbon atoms.

The organic carboxylic acids having from 1 to 18 carbon atoms are those of aliphatic or cycloaliphatic, saturated or unsaturated carboxylic acids or those of aromatic or heterocyclic carboxylic acids: For example, alkanoic acids, such as formic acid, acetic acid, propionic acid, butyric acid, isobutyric acid, valeric acid, isovaleric acid, trimethylacetic acid, caproic acid, β-trmethylproponic acid, oenanthic acid, caprylic acid, pelargonic acid, capric acid, undecylic acid, lauric acid, myristic acid, palmtic acid, stearic acid; alkenoic acids, such as undecylenic acid, oleic acid; cycloalkanoic acids, such as cyclopentylcarboxylic acid, cyclopropyl-carboxylic acid, cyclobutylcarboxylic acid, cyclohexyl-carboxylic acid; cyloalkylalkanoic acids, such as cyclopropylmethylcarboxylic acid, cyclobutyl-methyl-carboxylic acid, cyclopentylethylcarboxylic acids, cyclohexylethyl-carboxylic acid; arylalkanoic acids, such as phenylacetic acid, phenylpropionic acid; benzoic acid; phenoxyalkanoic acids, such as phenoxyacetic acid, p-chlorophenoxyacetic acid, 2,4-dichlorophenoxyacetic acid, 4-t.-butylphenoxyacetic acid, 3-phenoxypropionic acid, 4-phenoxybutyric acid; heterocycliccarboxylic acids, such as furane-2-carboxylic acid, 5-t.-butylfurane-2 - carboxylic acid, 5-bromofurane-2-carboxylic acid, nicotinic acid; β-ketocarboxylic acids, such as acetylacetic acid, propionylacetic acid, butyrylacetic acid; aminoacids, such as diethylaminoacetic acid, aspartic acid, etc.

The 11β-hydroperoxy-19-nor steroids of the general Formula II obtained by the process of the invention, are easily reducible by a weak reducing agent into the corresponding carbinols and because of this can serve also as important intermediates in the synthesis of steroid compounds of the general Formula III:

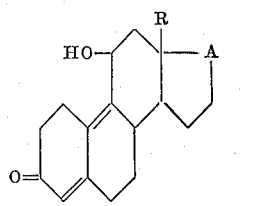

in which R and A have the above-noted meanings, as described in the copending commonly assigned United States patent application Serial No. 373,048, filed simutlaneously herewith.

The starting compounds, the 3-oxo-$\Delta^{5(10),9(11)}$ derivatives of Formula I can, for example, be prepared by applying the method described in United States Patent 3,052,672, by the action of pyrrolidine on the corresponding 4,5-seco-$\Delta^9$-3,5-dioxo derivatives or the corresponding $\Delta^{4,9}$-3-oxo derivatives, followed by a treatment with acetic acid of the enamine so obtained. The preparation of $\Delta^{5(10),9(11)}$-estradiene-3,17-dione is described later in a detailed manner as purely indicative of one such method.

The following examples illustrate the invention but present no limiting characteristic. It is to be understood that the process of the invention can be applied to other steroidal products of general Formula I, and particularly to those containing different alkyl substituents in the 13 position R=lower alkyl other than methyl) without departing from the body of the invention.

*Preparation of $\Delta^{5(10),9(11)}$-estradiene-3,17-dione (Compound I, R=CH$_3$ and A=>C=O)*

20 g. of 4,5-seco $\Delta^{9(10)}$-estrene,3,5,17-trione were introduced into 100 cc. of methanol under total darkness and under atmosphere of nitrogen. 10 cc. of pyrrolidine were added over a period of five minutes and the reaction mixture was allowed to stand overnight.

Thereafter, the mixture was cooled to $-10°$ C. The precipitate was vacuum filtered, washed with methanol, cooled to $-10°$ C., and dried under vacuum. 21.8 g. of 3-pyrrolidino-$\Delta^{3,5(10),9(11)}$-estratriene - 17 - one were obtained. The product had a melting point of 175–176° C. and a specific rotation $[\alpha]_D^{20}=+500°\pm5°$ (c.=0.5% in dimethylformamide.)

The product was insoluble in water, slightly soluble in alcohol, ether and acetone, and soluble in benzene and chloroform.

*Analysis.* — C$_{22}$H$_{29}$ON; molecular weight=323.46. Calculated: C, 81.69%; H, 9.04%; N, 4.33%. Found: C, 81.7%; H, 9.1%; N, 4%.

45 cc. of acetic acid were mixed with 900 cc. of water under an atmosphere of nitrogen and under total darkness, then 30 g. of 3-pyrrolidino-$\Delta^{3,5(10),9(11)}$-estratriene-17-one were added and the reaction mixture was stirred for 16 hours at room temperature. The mixture was cooled at about 0° C. Then a stream of nitrogen was allowed to bubble through the suspension obtained. The suspension was then vacuum filtered, washed with water, dried under vacuum, and 23.8 g. of product were obtained.

This crude product was dissolved in two volumes of hot ethanol under an atmosphere of nitrogen. The solution was cooled to about $-10°$ C. The precipitate was vacuum filtered, washed with ethanol cooled to $-10°$ C., and dried under vacuum. $\Delta^{5(10),9(11)}$-estradiene-3,17-dione having a melting point of 104° C. and a specific rotation $[\alpha]_D^{20}=+339°\pm3.5°$ (c.=0.5% in methanol), was obtained with a yield of 86% on the recrystallization.

The product occurred in form of white prismatic needles, insoluble in water and soluble in acetone, benzene and chloroform.

*Analysis.*—C$_{18}$H$_{22}$O$_2$; molecular weight=270.36. Calculated: C, 79.96%; H, 8.20%. Found: C, 80.2; H, 8.20.

*Example I.—Preparation of 11β-hydroperoxy-$\Delta^{4,9}$-estradiene-17β-ol-3-one*

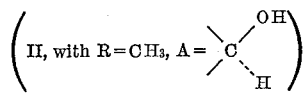

2 gm. of $\Delta^{5(10),9(11)}$-estradiene-17β-ol-3-one

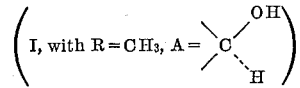

described in United States Patent No. 3,052,672, were dissolved under agitation in 10 cc. of absolute ethanol and 1 cc of triethylamine. The agitation was maintained for a period of two hours while bubbling a current of oxygen therethrough at room temperature.

Thereafter the reaction mixture was iced to $-10°$ C. The precipitate was vacuum filtered, washed by trituration with absolute ethanol and vacuum filtered. 1.275 gm. of product were obtained.

The product obtained was dissolved in 6 volumes of absolute ethanol, heated to reflux, filtered while hot, and iced to $-10°$ C. The precipitate was vacuum filtered and washed with iced ethanol. 11β-hydroperoxy$\Delta^{4,9}$-estradiene-17β-ol-3-one

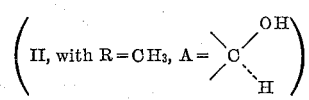

was obtained with a recrystallization yield of 85%. The product had a melting point of 202–207° C. and a specific rotation $[\alpha]_D^{20}=61°\pm1°$ (c.=0.5% in dimethylformamide).

The product occurred in the form of white platelets, insoluble in water, slightly soluble in ether, isopropyl ether, ethanol, cold acetone and hot chloroform.

*Analysis.*—C$_{18}$H$_{24}$O$_4$; molecular weight=304.37. Calculated: C, 71.02%; H, 7.95%. Found: C, 71.1; H, 8.0.

This compound is not described in the literature.

*Example II.—Preparation of 11β-hydroperoxy-17β-benzoyloxy-$\Delta^{4,9}$-estradiene-3-one*

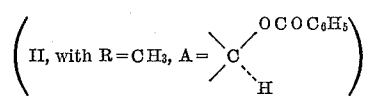

3.75 gm. of 17β-benzoyloxy-$\Delta^{5(10),9(11)}$-estradiene-3-one

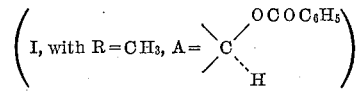

described in United States Patent No. 3,052,672, were introduced while agitating into 40 cc. of ethanol containing 1% of triethylamine and, while maintaining the agitation, a current of oxygen was bubbled through the solution for a period of two hours at room temperature. The reaction mixture was cooled thereafter to $-10°$ C. The precipitate formed was vacuum filtered and washed with ethanol cooled to $-10°$ C. After drying 2.85 gm. of 11β-hydroperoxy - 17β - benzoyloxy-$\Delta^{4,9}$-estradiene-3-one

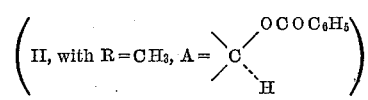

were isolated.

The product occurred in the form of colorless crystals, insoluble in water, slightly soluble in ether and ethanol and soluble in dimethylformamide.

This compound is not described in the literature.

*Example III.—Preparation of 11β-hydroperoxy-17α-ethynyl-Δ⁴,⁹-estradiene-17β-ol-3-one*

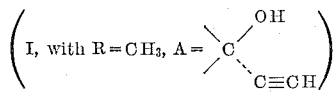

9 gm. of 17α-ethynyl-Δ⁵⁽¹⁰⁾,⁹⁽¹¹⁾-estradiene-17β-ol-3-one

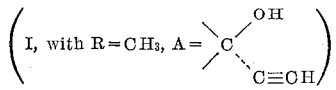

described in United States Patent No. 3,033,856, were introduced at room temperature into 45 cc. of methanol containing 1% of triethylamine and oxygen was allowed to bubble therethrough for a period of two hours, all while continuously agitating the suspension formed. After termination of the reaction, the reaction mixture was cooled for a period of one-half hour to about −10 to −12° C. The precipitate was vacuum filtered, washed with methanol and dried. 7.7 gm. of 11β-hydroperoxy-17α-ethynyl-Δ⁴,⁹-estradiene-17β-ol-3-one

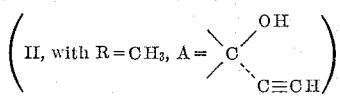

were obtained solvated with one mol of methanol.

The product had a specific rotation $[\alpha]_D^{20} = -18.8°$ (c.=0.2% in methanol).

The product occurred in the form of white crystals, insoluble in water, slightly soluble in ether, soluble in chloroform and ethanol. The product desolvated at 130° C. and melted at 170–172° C.

*Analysis.*—$C_{20}H_{24}O_4$; molecular weight =328.39. Calculated with 1 molecule of methanol: $C_{21}H_{28}O_5$; molecular weight=360.43. Calculated for the solvated product: C, 69.97%; H, 7.83%. Found: C, 69.9%; H, 7.9%.

This compound is not described in the literature.

*Example IV.—Preparation of 11β-hydroperoxy-17α-methyl-Δ⁴,⁹-estradiene-17β-ol-3-one*

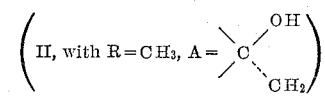

3 gm. of 17α-methyl-Δ⁵⁽¹⁰⁾,⁹⁽¹¹⁾-estradiene-17β-ol-3-one

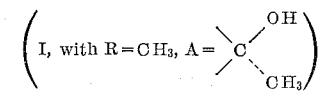

described in United States Patent No. 3,118,919, were dissolved in 30 cc. of ethanol containing 1% of triethylamine and a current of oxygen was allowed to bubble through the agitated solution for a period of two hours at room temperature.

The reaction mixture was evaporated to dryness under vacuum and a solid residue was obtained which was crystallized by trituration in isopropyl ether. After vacuum filtering, washing and drying, 2.9 gm. of 11β-hydroperoxy-17α-methyl-Δ⁴,⁹-estradiene17β-ol-3-one

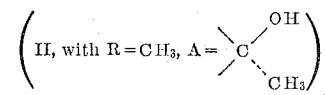

were isolated.

This compound is not described in the literature.

*Example V.—Preparation of 11β-hydroperoxy-17α-ethyl-Δ⁴,⁹-estradiene-17β-ol-3-one*

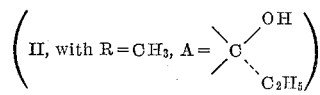

1.8 gm. of 17α-ethyl-Δ⁵⁽¹⁰⁾,⁹⁽¹¹⁾-estradiene-17β-ol-3-one (prepared in the same fashion as the corresponding 17α-methyl compound of the preceding example) were introduced into 20 cc. of ethanol containing 1% of triethylamine. A stream of oxygen was allowed to bubble through the agitated solution for a period of two hours at room temperature.

The reaction mixture was evaporated to dryness under vacuum and a semisolid residue was obtained which was triturated in isopropyl ether. The crystallized product obtained was vacuum filtered and dried. 1.4 gm. of 11β-hydroperoxy-17α-ethyl-Δ⁴,⁹-estradiene-17β-ol-3-one

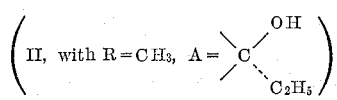

were thus isolated.

This compound is not described in the literature.

*Example VI.—Preparation of 11β-hydroperoxy-Δ⁴,⁹-estradiene-3,17-dione*

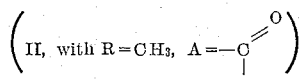

10 gm. of Δ⁵⁽¹⁰⁾,⁹⁽¹¹⁾-estradiene-3,17-dione

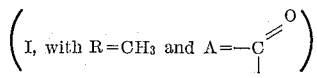

were dissolved in 100 cc. of absolute ethanol and 0.1 cc. of triethylamine. A current of oxygen was allowed to bubble through the solution for a period of 4 hours. The resultant suspension was cooled to a neighborhood of −10° C. under an atmosphere of oxygen for a period of one hour.

The precipitate formed was vacuum filtered, washed with ethanol iced to −10° C., and dried in the neighborhood of 40° C. 8.5 gm. of 11β-hydroperoxy-Δ⁴,⁹-estradiene-3,17-dione

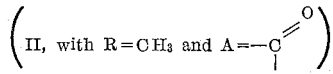

was obtained having a melting point of 228–230° C. and a specific rotation $[\alpha]_D^{20} = +113.3$ (c.=0.5% in chloroform).

The product occurred in the form of white hexagonal crystals, insoluble in water and slightly soluble in ether.

*Analysis.*—$C_{18}H_{22}O_4$, molecular weight=302.36; calculated: C, 71.50%; H, 7.33%; O, 21.17%. Found: C, 71.4%; H, 7.3%; O, 20.9%.

This compound is not described in the literature.

As has been indicated above, the compounds of general Formula IV present interesting pharamacological properties and they possess particularly an important hypocholesteroliemic action.

They can be utilized for the treatment of hypercholesterolemia in warm-blooded animals either as a preventive or curative agent for arterial disturbances, cerebral arteritis, aortitis, coronaritis, angina pectoris, and atheromatosis.

The 11β-hydroperoxy-Δ⁴,⁹-estradiene-3-ones substituted in the 17 position of general Formula IV are utilized orally, perlingually, transcutaneously or rectally.

They can be prepared in the form of injectable solutes or suspensions, prepared in ampules, in the form of tablets, coated tablets, sublingual tablets, capsules and suppositories.

The useful dosology is controlled between 0.1 mg./kg. and 5.0 mg./kg. per day in the warm-blooded animal as a function of the method of administration.

The pharmaceutical forms such as injectible solutions or suspensions, tablets, coated tablets, sublingual tablets, capsules and suppositories are prepared according to the usual processes.

The unitary dose is comprised between 5 and 15 mg.

*Example VII.—Pharmacological study, hypocholesterolemic activity in the female rat*

(1) 11β-hydroperoxy-17α-ethynyl-Δ$^{4,9}$-estradiene - 17β-ol-3-one, utilized in suspension in an aqueous liquid dispersant, was administered for a period of 10 days orally to some groups of female rats weighing about 200 gm. at daily doses of 1 and 5 mg./kg. The 11th day the animals were sacrificed. A sample of blood was taken from each animal in order to determine the seric sterols. The following organs, suprarenals, liver and kidneys were separated and weighed and, for certain of the groups, the amount of hepatic sterols was determined.

The following table résumés the results obtained.

TABLE I

| Lots | Doses, mg./kg. | Seric sterols, gm./1,000 | Hepatic sterols, gm./1,000 | Suprarenals, mg. | Liver gm. percent gm. | Kidneys, mg. percent gm. | Change of weight, percent |
|---|---|---|---|---|---|---|---|
| Controls | 0 | 0.84 | | 59.5 | 4.44 | 829 | +3 |
| Treated | 1 | 0.50 (−41%) | | 52.4 (−12%) NS | 4.14 | 806 | +2 |
| Controls | 0 | 0.58 | 2.33 | 64.3 | 4.29 | 781 | +7 |
| Treated | 5 | 0.21 (−64%) | 2.54 (+9%) NS | 68.1 (+4%) NS | 4.43 | 794 | −3 |

NS=not significant.

It can thus be seen that 11β-hydroperoxy-17α-ethynyl-Δ$^{4,9}$-estradiene-17β-ol-3-one possesses a clear hypocholesterolemic action at a dose of 1 mg./kg. and even much greater action at a dose of 5 mg./kg. These doses were orally administered daily for a period of 10 days. On the other hand, it can be observed that the product has no unfavorable influence on the growth of the animals nor on the weight of the suprarenals, of the liver and of the kidneys.

(2) 11β-hydroperoxy-Δ$^{4,9}$-estradiene-17β-ol-3-one was utilized subcutaneously under the same experimental conditions at a dose of 5 mg./kg. The following results were noted.

TABLE II

| Lots | Dose, mg./kg. | Seric sterols, gm./1,000 | Suprarenals, mg. | Liver, gm. percent gm. | Kidneys, mg. percent gm. | Change of Weight, percent |
|---|---|---|---|---|---|---|
| Controls | 0 | 0.57 | 52.9 | 4.02 | 755 | +4 |
| Treated | 5 | 0.43 (−24%) | 62.6 (+18%) NS | 4.35 | 787 | +8 |

NS=not significant.

It can thus be noted that 11β-hydroperoxy-Δ$^{4,9}$-esteradiene-17β-ol-3-one exercises a clear hypocholesterolemic action at a dose of 5 mg./kg. daily administered subcutaneously for a period of 10 days.

The weight of the different organs separated (suprarenals, liver and kidneys) reveals no abnormality and the produce has no unfavorable influence on the growth of the animals.

The preceding specific embodiments of the invention are illustrative of the principles involved. It is to be understood that other expedients known to those skilled in the art may be employed without departing from the body of the invention or the scope of the appended claims.

We claim:

1. 11β-hydroperoxy-19-nor steroids selected from the group consisting of compounds of the formula

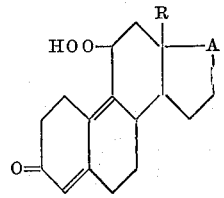

wherein R is a lower alkyl and A is a divalent linkage selected from the group consisting of

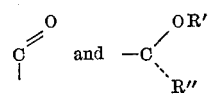

R' is a member selected from the group consisting of hydrogen and the acyl radical of an organic carboxylic acid having from 1 to 18 carbon atoms and R'' is a member selected from the group consisting of hydrogen, lower alkenyl and lower alkynyl.

2. 11β-hydroperoxy-19-nor steroids selected from the group consisting of compounds of the formula

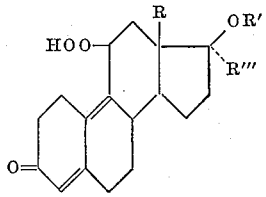

wherein R is a lower alkyl, R' is a member selceted from the group consisting of hydrogen and the acyl radical of an organic carboxylic acid having from 1 to 18 carbon atoms and R''' is a member selected from the group consisting of hydrogen and lower alkynyl.

3. 11β-hydroperoxy-17α-ethynyl-Δ$^{4,9}$-estradiene-17β-ol-3-one.

4. 11β-hydroperoxy-Δ$^{4,9}$-estradiene-17β-ol-3-one.

5. 11β-hydroperoxy - 17β-benzoyloxy - Δ$^{4,9}$-estradiene-3-one.

6. 11β-hydroperoxy-Δ$^{4,9}$-estradiene-3,17-dione.

7. A process for the production of 11β-hydroperoxy-19-nor steroids selected from the group consisting of compounds of the formula

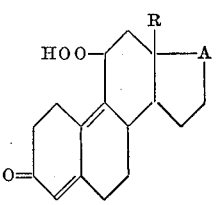

wherein R is a lower alkyl and A is a divalent linkage selected from the group consisting of

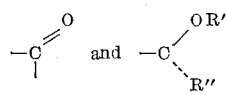

R' is a member selected from the group consisting of hydrogen and the acyl radical of an organic carboxylic acid having from 1 to 18 carbon atoms and R'' is a member selected from the group consisting of hydrogen, lower alkenyl and lower alkynyl which comprises the steps of oxidizing a compound of the formula

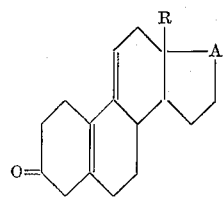

wherein R and A have the above-noted meanings by the action of an oxygen-containing gas in the presence of a weakly alkaline media in an inert organic solvent and recovering said 11β-hydroperoxy-19-nor steroids.

8. The process of claim 7 wherein said oxidation is effected in the presence of an amine compound selected from the group consisting of tri-lower-alkyl-amines, tertiary cyclic amines, and organic acid derivatives of quaternary ammonium compounds, as said weakly alkaline media.

9. The process of claim 7 wherein said oxidation is effected in the presence of an inert organic solvent selected from the group consisting of lower alkanols, N,N-di-lower-alkyl-lower-alkanoyl-amides and mixtures thereof.

10. A process for treatment of hypercholesterolemia which comprises administering a safe but effective dose of an 11β-hydroperoxy-19-nor steroid selected from the group consisting of compounds of the formula

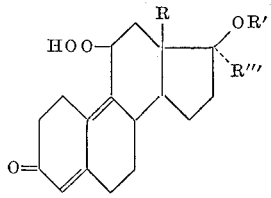

wherein R is a lower alkyl, R' is a member selected from the group consisting of hydrogen and the acyl radical of an organic carboxylic acid having from 1 to 18 carbon atoms, and R''' is a member selected from the group consisting of hydrogen and lower alkynyl.

References Cited by the Examiner
UNITED STATES PATENTS
3,211,764  10/1965  Brown et al. _____ 260—397.45

ELBERT L. ROBERTS, *Primary Examiner.*

UNITED STATES PATENT OFFICE
CERTIFICATE OF CORRECTION

Patent No. 3,301,756                      January 31, 1967

Robert Joly et al.

It is hereby certified that error appears in the above numbered patent requiring correction and that the said Letters Patent should read as corrected below.

Column 1, lines 20 to 30, the formula should appear as shown below instead of as in the patent:

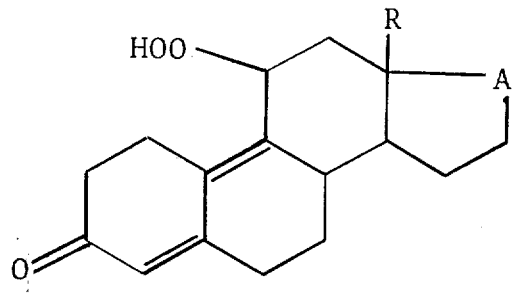

column 1, line 48, before "part" insert -- a large --; line 57, for "9,1-dehydro" read -- 9,11-dehydro --; line 60, for "presetn" read -- present --; column 3, line 63, for "chaarcterized" read -- characterized --; column 4, lines 5 to 14, the formula should appear as shown below instead of as in the patent:

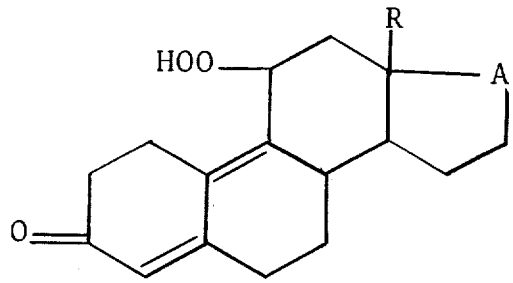

3,301,756 line 52, for "β-trmethylproponic" read -- β-trimethylpropionic --; line 54, for "palmtic" read -- palmitic --; column 5, line 14, for "simutlaneous-" read -- simultaneous- --; line 30, for "position R" read -- position (R --; column 6, line 34, for "61°" read -- +61° --; column 7, lines 39 to 44, for that portion of the formula reading $$CH_2 \quad\quad \text{read} \quad\quad CH_3$$

column 8, line 55, for "lesteroliemic" read -- lesterolemic --; column 9, line 3, for "1β" read -- 11β --; line 29, for "Δ⁴,9" read -- $\Delta^{4,9}$ --; column 10, lines 3 to 7, the formula should appear as shown below instead of as in the patent:

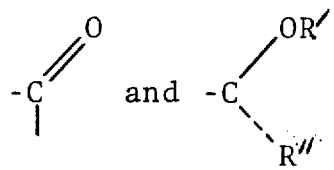

line 39, for "selceted" read -- selected --; column 11, lines 3 to 6, the right-hand portion of the formula should appear as shown below instead of as in the patent:

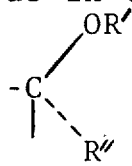

Signed and sealed this 21st day of November 1967.

(SEAL)
Attest:

EDWARD M. FLETCHER, JR.
Attesting Officer

EDWARD J. BRENNER
Commissioner of Patents